United States Patent
Roha

[19]
[11] Patent Number: 6,117,302
[45] Date of Patent: Sep. 12, 2000

[54] FUEL CELL ALUMINUM PRODUCTION

[75] Inventor: David J. Roha, Greensburg, Pa.

[73] Assignee: Aluminum Company of America, Pittsburgh, Pa.

[21] Appl. No.: 09/136,097

[22] Filed: Aug. 18, 1998

[51] Int. Cl.[7] .................................................. C25C 3/06
[52] U.S. Cl. ...................... 205/343; 204/244; 204/243.1; 204/245; 204/DIG. 4
[58] Field of Search .............................. 204/269, DIG. 4, 204/244, 243.1, 245; 429/26, 30, 31, 33, 40; 205/343

[56] References Cited

U.S. PATENT DOCUMENTS

| | | | |
|---|---|---|---|
| 4,689,133 | 8/1987 | McIlhenny | 204/269 |
| 5,130,210 | 7/1992 | Iwasaki et al. | 429/33 |
| 5,286,359 | 2/1994 | Richards et al. | 204/243 |
| 5,908,713 | 6/1999 | Ruka et al. | 429/31 |
| 6,039,862 | 3/2000 | Rapp | 205/386 |

FOREIGN PATENT DOCUMENTS

1948462  4/1971  Germany .......................... 204/DIG. 4

*Primary Examiner*—Kathryn Gorgos
*Assistant Examiner*—Thao Tran
*Attorney, Agent, or Firm*—Douglas G. Glantz; Glenn E. Klepac

[57] ABSTRACT

A process and apparatus are disclosed for electrolytically smelting alumina to produce aluminum metal, including providing a combination solid oxide fuel cell and electrolytic smelting cell for the production of aluminum from refined alumina positioned near the solid oxide fuel cell. In one aspect, an alumina ore refinery for producing the refined alumina is positioned near the solid oxide fuel cell, and refined alumina is passed at a temperature of at least 900° C. directly from the alumina ore refinery to the electrolytic smelting cell. In one aspect, the solid oxide fuel cell incorporates a planar construction having a solid state cathode material of lanthanum strontium manganate, a solid electrolyte of yttria stabilized zirconia, and a nickel/yttria stabilized zirconia cermet anode.

25 Claims, 5 Drawing Sheets

FUEL CELL ALUMINUM PRODUCTION

BACKGROUND OF THE INVENTION

1. Technical Field

This invention relates to a process for the electrolytic production of aluminum. In one aspect, this invention relates to a novel process for the electrolytic production of aluminum using a fuel cell.

2. Background

Aluminum metal is produced commercially by the electrolytic smelting of alumina. Bauxite alumina ore is refined in a Bayer plant, and the refined alumina is smelted in an electrolytic bath of molten salts in a Hall-Heroult cell plant. These molten salts include cryolite ($3NaF$—$AlF_3$) and minor additions of salts such as $LiF$ and $CaF_2$. Actual Hall-Heroult cell bath contains less NaF than the specific composition formula of $3NaF$–$AlF_3$ and varies somewhat from plant to plant. Relatively pure refined alumina is reduced in the molten salts in the Hall-Heroult electrolytic cell, named Hall-Heroult after the earliest independent inventors of the electrolytic process for producing aluminum.

The electrolytic smelting reaction is carried out in the Hall-Heroult cell process in an aluminum reduction pot in which alumina is dissolved in the molten salt bath. The alumina in solution in the molten salt is electrolyzed to form metallic aluminum. Aluminum metal produced in the reaction is heavier than the electrolyte and forms a molten layer at the bottom of the reduction pot which serves as the cathode of the cell. Carbon anodes extend into the bath, and oxide ions react electrochemically with the carbon to produce carbon dioxide, which is liberated at the anode.

The cost of making aluminum has not changed very much in the past few decades. Those changes that have taken place have been incremental, evolutionary changes in the fundamental Hall-Heroult process.

INTRODUCTION TO THE INVENTION

Most attempts to improve the energy efficiency of the aluminum production smelting cells have worked on reducing the IR drops in the cells. However, programs for reducing the IR drops in the Hall-Heroult cells run into the thermodynamic barrier of having to create heat just to maintain the temperature of the cell. The "Inert Anode Cell," also called the "Energy Efficient Cell," is an alternative aluminum reduction cell design developed and built by Aluminum Company of America for its electrical efficiency. The Inert Anode Cell also runes into the thermodynamic barrier of having to create heat just to maintain the temperature of the cell.

Aluminum smelting in a Hall-Heroult process cell contributes significantly to the consumption of electrical energy, most of which comes from the burning of fossil fuels in the United States.

A process is needed to produce aluminum in commercial quantities efficiently and economically, to conserve electrical energy, and to reduce the emissions of carbon dioxide released to the atmosphere.

Fuel cells are energy conversion devices. A fuel cell is a device that converts chemical energy to electricity and thermal energy. A fuel cell operating on hydrogen from reformed hydrocarbon fuel combines hydrogen and oxygen from air to produce water as the overall chemical reaction in the fuel cell. Electrochemical reactions at the two electrodes distinguish the fuel cell from simple combustion.

The fuel cell components are the anode where fuel is oxidized, the cathode where oxygen is reduced, and the electrolyte. The electrolyte may be a liquid or a solid and separates the reactants to isolate the anode and cathode electronically. Tile electrolyte forms an ionic bridge between the two electrodes. Multiple cells are stacked in series to achieve higher voltages. Fuel cell reactants can be supplied continuously to produce electricity indefinitely.

The net reaction in a fuel cell power plant is the combination of the fuel and oxidant to produce water and carbon dioxide. Unlike a process for burning fuel to liberate heat, a fuel cell converts chemical energy directly into electrical energy and is not limited in efficiency by the Carnot cycle.

A hydrogen/oxygen fuel cell at room temperature can achieve thermodynamic efficiencies of 95%. By contrast, a steam or gas turbine power plant being limited by the Carnot cycle, achieves less than a 40% energy conversion efficiency.

Fuel cells were used by NASA in the Gemini and Apollo space programs aid still are used today in the Space Shuttle. Alkaline $H_2/O_2$ fuel cells were selected for low weight considerations at high energy density. The alkaline $H_2/O_2$ fuel cells which powered the Gemini/Apollo space capsules and the Space Shuttle cannot use air as the oxidant since too much atmospheric $CO_2$ would be absorbed. Phosphoric acid based fuel cells have no such limitation and have been developed as local electric power generators. The U.S. armed forces uses them as mobile electricity sources and promotes their use in civilian applications.

ONSI, a private fuel cell manufacturer, is selling 200 kW units which run off of natural gas. Over 100 such units have been delivered. However, these fuel cells use expensive platinum catalysts. They also require a reformer to convert more commonly available hydrocarbon fuels into hydrogen.

Molten carbonate fuel cells (MCFC) use an electrolyte of alkali metal carbonates and circumvent kinetic limitations by operating at higher temperatures (650° C.). Less expensive nickel catalysts can be used. However, a reformer is needed to use standard hydrocarbon fuels. Demonstration scale MCFCs have been run and soon will be available commercially.

Greatly advantageous would be a process to produce aluminum which would reduce the electrical energy required to produce the aluminum metal on a per pound basis, and further which would reduce the overall emissions of carbon dioxide into the atmosphere.

It is an object of the present invention to provide a novel process for the electrolytic smelting of alumina to produce aluminum metal.

It is an object of the present invention to provide a novel process for the electrolytic smelting of alumina to produce aluminum metal efficiently and cleanly.

It is an object of the present invention to provide a novel process for the electrolytic smelting of alumina to produce aluminum metal which would reduce the electrical energy required to produce the aluminum metal on a per pound basis.

It is an object of the present invention to provide a novel process for the electrolytic smelting of alumina to produce aluminum metal which would reduce overall emissions of carbon dioxide into the atmosphere.

It is an object of the present invention to provide a novel process for the electrolytic smelting of alumina to produce aluminum metal which overcomes the problems associated with the heat consuming nature of aluminum smelting.

It is an object of the present invention to provide a novel process for the electrolytic smelting of alumina to produce aluminum metal which does not require connection to all external electric power grid or the associated electrical equipment for connection to an external electric power grid.

These and other objects of the present invention will be described in the detailed description of the invention which follows. These and other objects of the present invention will become apparent to those skilled in the art from a careful review of the detailed description and by reference to the figures of the drawings.

SUMMARY OF THE INVENTION

The process and apparatus of the present invention provide method and means for electrolytically smelting alumina to produce aluminum metal, including providing a combination solid oxide fuel cell and electrolytic smelting cell positioned near the solid oxide fuel cell or in contact with the solid oxide fuel cell. In one embodiment, the electrolytic smelting cell is positioned within no more than two centimeters distance from the solid oxide fuel cell. In one aspect, the present invention includes providing an alumina ore refinery for producing the refined alumina, wherein the refinery is positioned near the solid oxide fuel cell, and passing the refined alumina at a temperature of at least 900° C. directly from the alumina refinery to the electrolytic smelting cell. In one aspect, the present invention incorporates a solid oxide fuel cell of a planar construction having a solid state cathode material of lanthanum strontium manganate, a solid electrolyte of yttria stabilized zirconia, and a nickel/yttria stabilized zirconia cermet anode.

DETAILED DESCRIPTION

The present invention provides a novel fuel cell powered process for the electrolytic smelting of aluminum. Several fuel cells are combined in series with an aluminum electrolytic smelting cell. The fuel cells are combined in such a way that the electrical power consumed by the aluminum electrolytic smelting cell is supplied by the fuel cells.

In one aspect, the fuel cells preferably are placed in close physical contact with the aluminum electrolytic smelting cell. Although the fuel cells can be placed in a position physically separate from the aluminum electrolytic smelting cell, it has been found that special advantages accrue from placing the fuel cells in close physical contact with the aluminum electrolytic smelting cell. Such close physical contact facilitates heat exchange and reduces electrical resistance.

In one embodiment, the electrolytic smelting cell is positioned within no more than six centimeters distance from the solid oxide fuel cell, preferably no more than two centimeters distance from the solid oxide fuel cell, and, most preferably, the electrolytic smelting cell is positioned within direct physical contact of the solid oxide fuel cell.

Such close physical contact provides significant heat conduction and lower electrical resistance.

In one aspect, no external electrical power needs to be supplied to the cell. All the energy needed to smelt aluminum can come from the fuel and air or oxygen supplied to the fuel cell.

The fuel to be supplied to run the cell can be natural gas, hydrogen, coal gas, synthesis gas, or other such materials.

The oxidizer can be air or oxygen gas derived from smelting or an external oxygen plant.

Waste heat derived from the fuel cell can supply the reversible heat consumed by the smelting cell. The waste heat utilization provides for an efficient smelting cell design. Additional waste heat is used to reform methane, exchange heat with incoming gas streams, or heat an external process such as the refining of alumina.

Energy savings are achieved by eliminating electrical leads, eliminating the need to conduct electrical current in electrodes parallel to the plane of the electrodes. shrinking the thickness of electrodes and electrolytes, increasing the electrode surface area per unit volume, and reducing current density.

The aluminum production electrolytic anode technology incorporated in the process of the present invention includes an inert anode, a solid oxide anode, all anode depolarized with a reducing gas, or a consumable carbon anode.

Preferably, the fuel cells are solid oxide fuel cells (SOFC). Solid oxide fuel cells (SOFC) as used in the process of the present invention for producing aluminum incorporate solid electrolytes which conduct oxide ions and operate around 700–1000° C. The solid electrolyte in SOFCs preferably is yttria stabilized zirconia. There is no liquid electrolyte to leak. The kinetics are fast, and current densities are high, even without exotic catalysts. SOFCs can be fed simple hydrocarbons, such as methane, in the presence of steam. They can reform simple hydrocarbons in-situ to $H_2$ and CO, thus eliminating the need for a separate reformer. The SOFC when used in the process of the present invention can run continuously for many years.

In the combined fuel cell/smelting cell of the present invention, the fuel cell and the smelting cell provide enhanced efficiencies resulting from a close physical contact with each other inside a complete process unit. The fuel cell and smeltil—cell are close to the same temperature and can transfer heat back and forth. Their close proximity to each other permits other energy efficiencies that can not be achieved with separated cells.

The apparatus of the present invention for reducing a metal salt to a metal includes an electrolysis cell having an electrolysis anode, an electrolysis cathode, and a metal salt in a chamber between the electrolysis anode and cathode; a fuel cell having at fuel cell cathode adjacent the electrolysis anode and connected electrically therewith, a fuel cell anode, a solid conductor of anions between the fuel cell cathode and anode, and a fuel compartment adjacent the fuel cell anode; and conductor means for electrically connecting the electrolysis cathode and the fuel cell anode.

The process of the present invention for electrolytically reducing a metal salt to a metal in the apparatus of the apparatus of the present invention includes (1) reacting a fuel with anions adjacent the fuel cell anode; (2) electrolyzing the metal salt in the electrolysis cell, thereby to produce a metal adjacent the electrolysis cathode and anions adjacent the electrolysis anode; and utilizing the anions of step (2) in the reaction of step (1).

The process of the present invention further includes providing conductive heat transfer back and forth from the electrolysis cell and the fuel cell.

The reduced metal produced by the process of the present invention includes aluminum, magnesium, silicon, titanium, lithium, lead, zinc, or zirconium.

The metal salt reduced by the process of the present invention includes aluminum oxide, magnesium oxide, silicon oxide, titanium oxide, lithium oxide, lead oxide, zinc oxide, zirconium oxide, or aluminum chloride.

Figure 1:
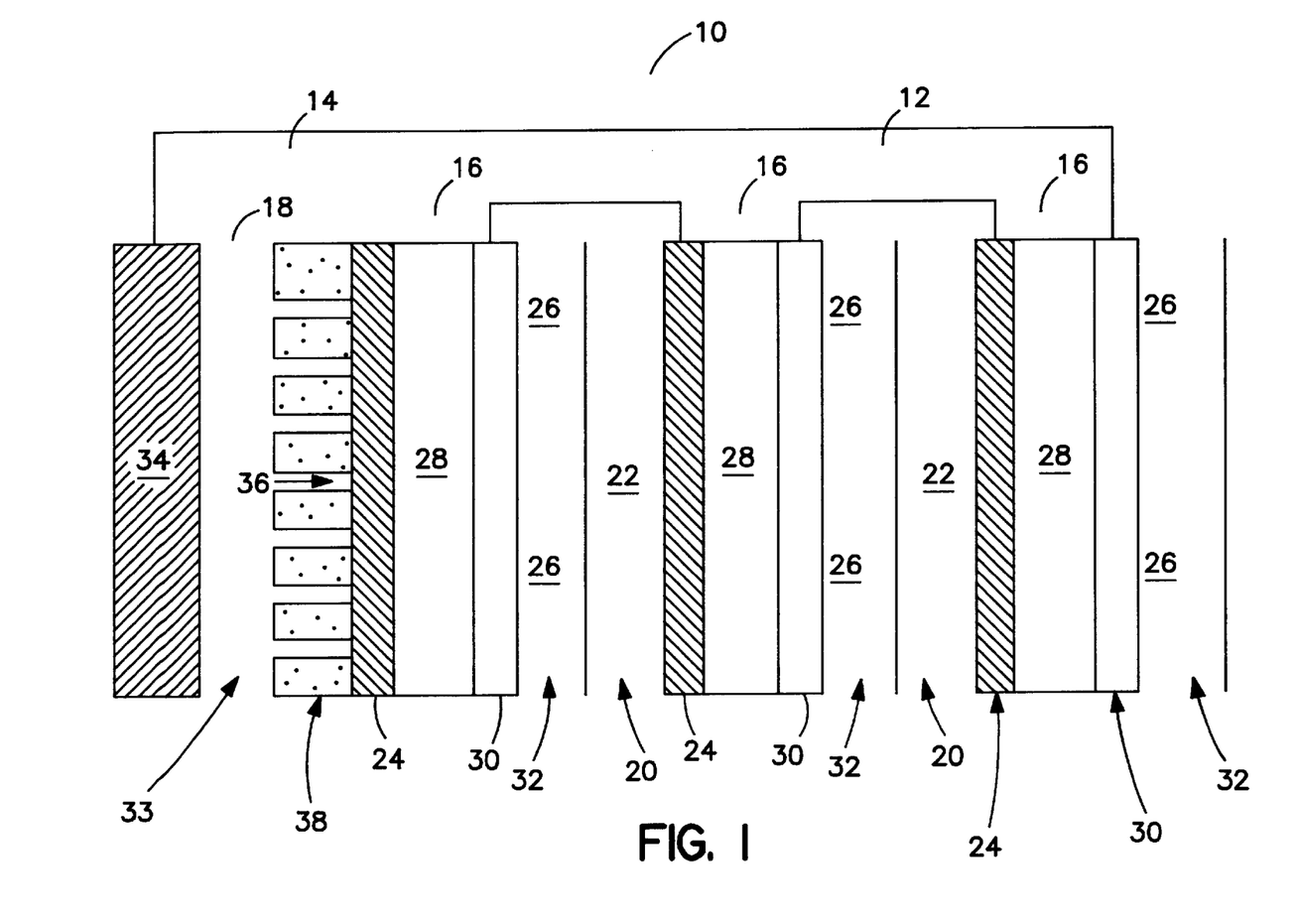
FIG. 1 is a schematic diagram showing a novel aluminum smelting cell and fuel cell combination of the present invention incorporating an inert anode.

Referring now to FIG. 1, a combination electrolytic/fuel cell 10 is shown having an solid oxide fuel cell (SOFC) component 12 combined with an inert anode smelting cell component 14.

The SOFC component 12 includes three SOFC cells 16 in series to build up enough voltage to drive one smelting cell 18. The SOFC component shown in FIG. 1 contains only three cells for convenience of illustration. The SOFC component preferably will include more than three cells. Each SOFC cell 16 has a cathode compartment 20 containing air 22 and a solid state cathode material 24, e.g., such as lanthanum strontium manganate (LSM), where oxygen in the air 22 is reduced to oxide ions 26, as shown in Equation 1. Alternatively, the compartment 20 may contain oxygen.

$$O_2 + 4e^- 2O^{2-} \quad \text{(Eq. 1)}$$

Oxide ions 26 electro-migrate through the cathode 24 and a solid electrolyte 28, e.g., such as yttria stabilized zirconia (YSZ) to an anode 30, e.g., such as Ni/YSZ cermet. At the anode 30, oxide ions 26 are oxidized in the presence of a hydrogen and carbon monoxide mixture 32 and release electrons, as shown in Equations 2 and 3. Other Suitable reducing agents may replace all or part of the hydrogen and carbon monoxide mixture.

$$O^{2-} + H_2 \rightarrow H_2O + 2e^- \quad \text{(Eq. 2)}$$

$$O^{2-} + CO \rightarrow CO_2 + 2e^- \quad \text{(Eq. 3)}$$

Methane-steam mixtures can be used as the fuel, and at the temperatures of operation of cell 16, i.e., 900–1000° C., the methane-steam mixture can reform to produce hydrogen and carbon monoxide, as shown in Equation 4.

$$CH_4 + H_2O \rightarrow CO + 3H_2 \quad \text{(Eq. 4)}$$

The carbon monoxide and hydrogen then can oxidize oxide ions 26 at the anodes 30.

The three fuel cells 16 in series develop enough voltage to drive the one inert anode cell 18. Aluminum ions dissolved in the molten bath 33 are reduced at a $TiB_2$ inert cathode 34 to produce aluminum metal. Oxygen 36 is evolved at the inert anode 38. If the inert anode 38 is porous, oxygen gas 36 then can flow to the cathode 24 of the fuel cell 16 where it is reduced. Alternately, the inert anode 38 can itself be an oxide conductor and conduct oxide ions through the electrolyte 28 to the fuel cell anode 30.

The overall reaction is shown in Equation 5.

$$12O_2 + 9CCH_4 + 4Al_2O_3 \rightarrow +8Al + 9CO_2 + 18H_2O \quad \text{(Eq. 5)}$$

Figure 2:
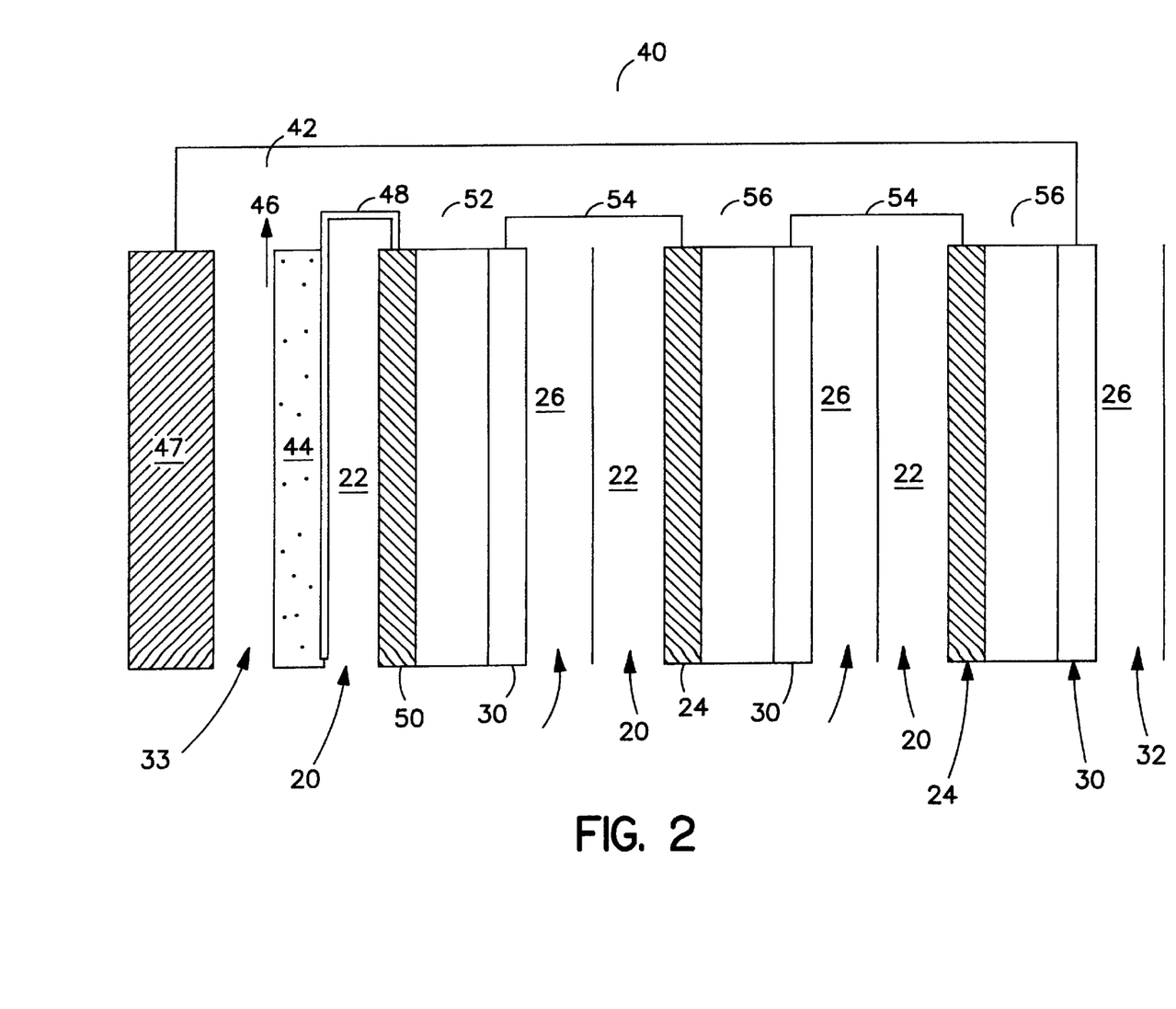
FIG. 2 is a schematic diagram showing a novel aluminum smelting cell and fuel cell combination of the present invention incorporating a consumable carbon anode.

Referring now to FIG. 2, a combined cell 40 operates in conjunction with a Hall-Heroult cell 42. An anode of carbon 44 is oxidized to $CO_2$ gas 46. Aluminum metal produced in the cell is deposited on the cathode 47. A sliding electrical contact 48 is made to a cathode 50 of a fuel cell 52, but no air can be permitted to contact the carbon anode 44 and cause air burning. As carbon is consumed, it can be replenished by sliding fresh carbon in its place.

The electrical connections 48 and 54 for adjacent cells 56 are shown in the schematic of FIG. 2 as leading out of the cell stack for illustration purposes.

Figure 3:
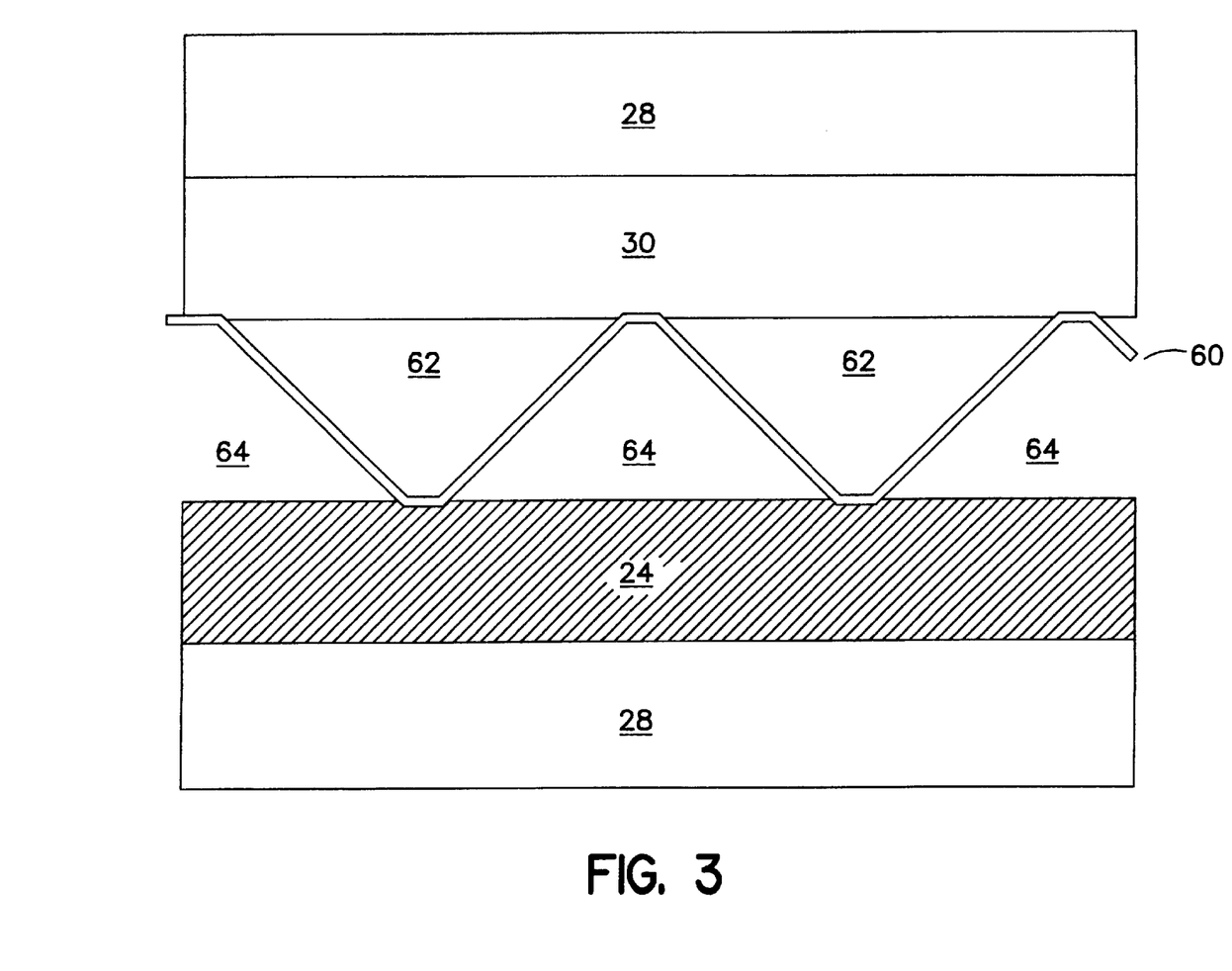
FIG. 3 is a schematic diagram showing back-to-back electrical connections used in a novel aluminum smelting cell and fuel cell combination of the present invention.

Referring now to FIG. 3, in actual operation, electrical connections are constructed directly in the stack as shown in electrical connections 60 constructed directly in the stack. The electrical connections also serve as separators to keep the fuel and oxidizer streams from contacting each other. Hydrogen 62 is shown adjacent the anode 30, and oxygen 64 is adjacent cathode 24.

In the case of electrical connections 60 constructed directly in the stack, the voltage drop attributable to electrical conduction is minimized laterally through cathodes 24 and anodes 30 and in lieu of exterior electrical connections. Cathodes 24 and anodes 30 are not required to be made thick, just to allow adequate lateral electrical conduction, as is the case with conventional Hall-Heroult cell and inert-anode designs. In the combined process of the present invention, cathodes 24 and anodes 30 are made thin, thereby to conserve the cost of materials while at the same time reducing IR drop. In the combined process of the present invention, thinner cells provide lower material costs, greater metal production per unit volume, and more efficient operations.

Figure 4:
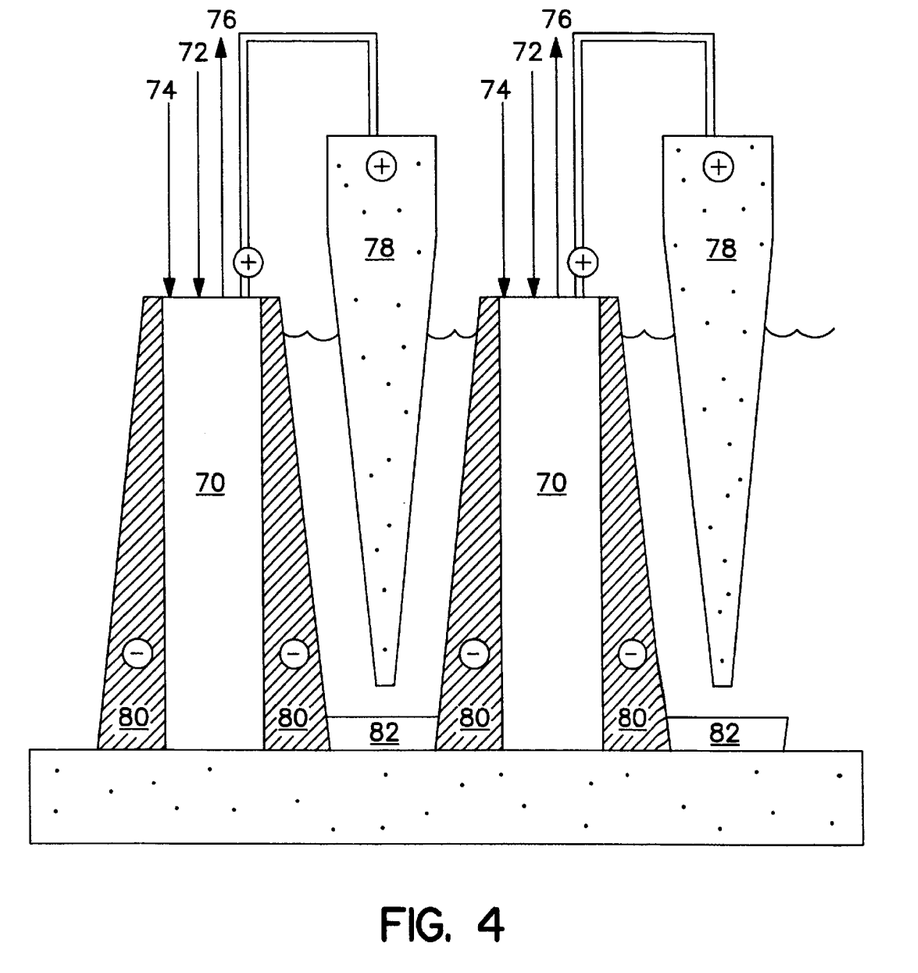
FIG. 4 is a schematic diagram showing a novel aluminum smelting cell and fuel cell combination of the present invention incorporating removable self-contained hermetically sealed fuel cell battery power packs.

Referring now to FIG. 4, a modular SOFC "Power Pack" is shown. The modular SOFC "Power Pack" is sealed to prevent bath penetration, in powering a consumable carbon anode cell such as a Hall-Heroult cell. The modular SOFC unit can be removed from the smelting cell as the cell is decommissioned, and the modular SOFC unit then can be reused. Air 72 and methane 74 are fed to the fuel cell 70, and POC 78 is withdrawn. POC 78 represents products of combustion including $CO_2$, $H_2O$ and $N_2$. Smelting takes place between carbon anode 78 and titanium diboride cathode 80 to form molten aluminum metal 82.

The combined fuel cell/electrolytic cell of the present invention significantly reduces the energy cost of smelting aluminum. The combination cell can be designed with thin gaps and high electrode surface area to reduce the IR drop in the cell.

In the combined fuel cell/electrolytic cell of the present invention, much of the capital cost involved with power generation, transmission, transforming, rectification, and distribution is eliminated.

In the combined fuel cell/electrolytic cell of the present invention, the amount of aluminum smelted per unit volume is increased. The higher amount of aluminum smelted per unit volume reduces capital costs.

Tile combined fuel cell/electrolytic smelting cell of the present invention is run in a continuous operation. The continuous operation reduces labor costs.

In the combined fuel cell/electrolytic cell of the present invention, high temperature waste heat is reused in processes, upstream and downstream from the smelting cell.

The higher energy efficiency of the combined fuel cell/electrolytic cell of the present invention significantly reduces the amount of carbon dioxide released to the atmosphere. The amount of carbon dioxide generated in the combined fuel cell electrolytic cell of the present invention to produce a pound of aluminum is significantly lower than the amount of carbon dioxide generated to produce a pound of aluminum in all process generating electricity from coal combined with a conventional refinery and Hall-Heroult cell.

In the aluminum smelting process of the present invention powered by solid oxide fuel cells, waste heat from the fuel cells is put to use in other parts of the plant. Energy is saved by utilizing the highly efficient fuel cells.

In one aspect, the solid oxide fuel cells integrated closely with the smelting cells forms a complete unit with no exterior electrical connections. All the electrochemistry is internal to the unit. Alumina, fuel, and air are fed to the unit. Exhaust gases and aluminum metal come out. The thermodynamics and design of this integrated cell of the present invention allow for significant energy efficiencies.

In one aspect, an alumina ore refilling plant is integrated with the smelting plant. The waste heat from the fuel cells supplies part or all the heat requirements of the alumina ore refinery, reducing the cost of the refined alumina.

The theoretical maximum thermal efficiency of a fuel cell, based on the heating value of the fuel, drops with increasing temperature. More waste heat must be evolved as temperature rises.

In the combination fuel cell/smelting cell of the present invention, however, high temperature waste heat has been found to be put to good use. The operating temperature of the solid oxide fuel cell (about 100° C.) in the aluminum smelting process of the present invention powered by solid oxide fuel cells is in the range of the operating temperature of a Hall-Heroult cell (960° C.) and also of the fluidized bed calciner (900°–950° C.).

In the aluminum smelting process of the present invention powered by solid oxide fuel cells, electrical power is transmitted directly from the DC of the fuel cells to the DC of the smelting pot. The power conditioning equipment needed to convert the fuel cell DC to high voltage AC current is eliminated, as well as the transformers and rectifiers used to convert AC to the DC current used by the pot-line.

In an integrated plant for the alumina refining and aluminum smelting process of the present invention powered by solid oxide fuel cells, the hot exhaust gases are used to calcine alumina, to provide steam to the Bayer plant, and to fire furnaces for metal processing.

In the combined fuel cell/smelting cell of the present invention, alumina, fuel, and oxygen come in. Exhaust gas and aluminum metal come out. The system either consumes or produces electrical energy. Heat is rejected to its surroundings or absorbed from its surroundings. In a manner of analysis, a Hall-Heroult cell is a combination fuel cell/ smelting cell. Fuel is fed to it in the form of carbon, but it also consumes electricity and produces aluminum.

Reversible systems are ideal systems so perfect and frictionless that they are at the maximum efficiency allowed by the second law of thermodynamics. The reversible efficiencies of various electrochemical cells can be viewed as a function of reversible heat flow.

Both the Hall-Heroult and Inert Anode smelting cells are endothermic. Under ideal or reversible conditions, they must absorb heat from outside sources to maintain all entropy balance and therefore satisfy the second law of thermodynamics. If they do not absorb external heat, the cell will cool down.

Fortunately, from the standpoint of maintaining cell temperature, the present day Hall-Heroult cell is energy inefficient. Enough electrical power is destroyed through IR drops and other mechanisms not only to supply the reversible heat, but also to create all excess of heat which must be removed from the cell.

The efficiency of smelting cells could improve, for example, by reducing the anode-cathode distance, by reducing the electrical resistance of the anode and cathode blocks, or by increasing the electrode surface area while reducing the current density. However, the cell's heat loses also must be cut, through better insulation and more heat recovery from anode gases. Eventually, the cell is insulated perfectly, and the heat created by cell inefficiencies matches the reversible heat absorbed by the system.

This represents a practical upper limit on the efficiency of a smelting cell. Of course, one could supply the reversible heat from another source, such as a gas flame, but practically, it is simpler to destroy electrical energy.

The hydrogen fuel cell represents the other extreme. According to the second law of thermodynamics, under reversible conditions it must reject heat to the environment. Therefore, out of all the chemical energy made available to it, some must be lost as heat, the remainder could theoretically be converted to electricity.

The reversible heat loss of the hydrogen fuel cell goes up with temperature. SOFCs must compete with other fuel cell concepts which operate at lower temperatures and have higher theoretical efficiencies. In practice, however, efficiencies for all present fuel cells are in the 40–60% range. Overall efficiencies of SOFCs are boosted by utilizing the high temperature waste heat, such as generating steam or running a turbine.

The theoretical maximum efficiency of a methane burning fuel cell is virtually 100%. It may be viewed as a methane reformer operating in series with a hydrogen fuel cell. While the hydrogen fuel cell is exothermic, methane reforming is endothermic. The reversible heat given off by the hydrogen fuel cell can be reversibly absorbed by the reforming reaction. Very little net reversible heat is given off making the maximum theoretical efficiency very high.

The methane fuel cell cannot be expected to be perfectly efficient. Some electrical energy will be destroyed and turned into heat which must flow from the system. Some fuel gas will leak through pores in the electrolyte and react with oxygen to produce heat. The waste heat can supply reversible heat to the smelting cell, by putting both cells in intimate contact. Other efficiencies appear in both the fuel cell and smelting cell as a result of this combination.

Real combined-cell characteristics involve voltages obtained by combining fuel cells in series to create a voltage high enough to drive a smelting cell, and specified current density as viewed in the perspective of real polarization curves of the cells.

Figure 5:
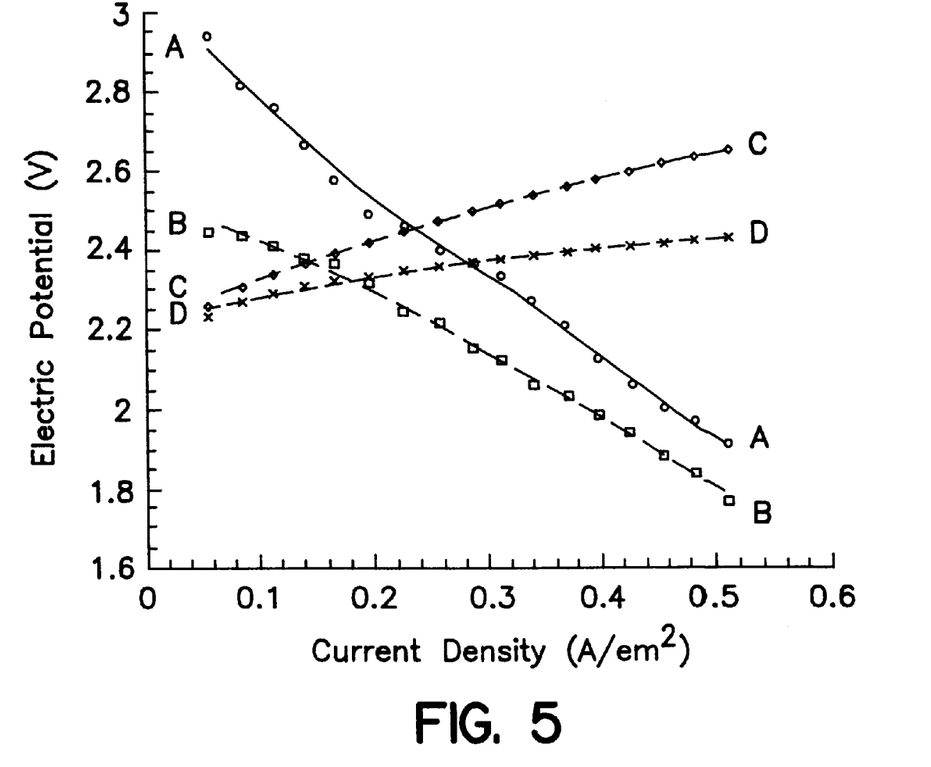
FIG. 5 is a graphical depiction showing experimental polarization curves for a novel aluminum smelting cell and fuel cell combination of the present invention.

Referring now to FIG. 5 as an example, experimental polarization curves are shown for two different SOFCs A and B multiplied by three to account for three cells being connected in series. The two SOFC cells A and B differ because of different operating conditions and cell design. Most SOFC polarization curves fall between these two cases.

The theoretical inert anode polarization curves C and D were obtained using the equilibrium voltage plus voltage drop through the anode-cathode distance, ACD, for ionic conductivity plus the over-potential needed to drive the anode and cathode reactions. The voltage drops through the anode and cathode materials were discounted. The $TiB_2$ cathode is very conductive. The inert anode itself call be made conductive through metal additions. Alternatively, discounting anode wear, the anode can be made thin, thus reducing the voltage drop through it. The anode cell voltage is actually negative in relation to the fuel cell voltage.

No external voltage is being applied. So the sum of the voltages of the smelting cell and the three SOFCs must be zero. The current through the SOFCs and the smelting cell is equal. The operating point is at the junction where the SOFC and smelting curves cross in FIG. 5.

In the combined fuel cell/smelting cell of this example, the operational current density ranges from 0.14 to 0.28 A/cm$^2$. In an illustrative embodiment, three SOFCs power one smelting cell. More SOFCs generate a greater voltage and permit operation of the smelting cell at greater current densities and greater aluminum throughput. Any number of SOFCs can be used in series provided enough voltage is generated to drive at least the thermodynamic equilibrium voltage of the smelting cell. The operational current density for Hall-Heroult cells typically is 1 A/cm$^2$. The operational current density for the Inert Anode cell typically is 0.3 A/cm$^2$. Loss of metal production per unit electrode area is made up by increasing the surface area of the electrodes per unit volume in the combined fuel cell/smelting cell of the present invention. The thickness of a single SOFC typically is 150 microns. The gas space and separator between cells is on the order of a few millimeters. At a smaller dimension for the size of the smelting cell in the combined fuel cell/smelting cell of the present invention, the production of aluminum per unit volume is high even with the lower current density.

In the combined fuel cell/smelting cell of the present invention, the fuel cell and the smelting cell provide enhanced efficiencies resulting from a close physical contact with each other inside a complete process unit. The fuel cell and smelting cell are close to the same temperature and can transfer heat between each other. Their close proximity to each other permits other energy efficiencies that can not be achieved with separated cells. In an illustrative embodiment, a slab of electrode material or a region of electrolyte has length l, width w, and thickness t. For a resistivity, ρ, of such a region, the resistance R for electrical current in the perpendicular direction is shown in Equation 6.

$$R=\rho(l \cdot w/t) \quad \text{(Eq. 6)}$$

The resistance R for electrical current in the parallel direction is shown in Equation 7.

$$R=\rho(w \cdot t/l) \quad \text{(Eq. 7)}$$

As the thickness t decreases, the resistance for taking current in or out of the electrode in the parallel direction becomes inversely greater. The resistance associated perpendicular current becomes proportionately less.

In the combination apparatus and process of the present invention, a path is provided for the progressive miniaturization of both the smelting cell and fuel cell components without the exorbitant resistive losses associated with conventional parallel circuitry. In the combination apparatus and process of the present invention, the electrode and electrolyte resistances decrease with miniaturization because of the close physical contact.

In the combined fuel cell/smelting cell of the present invention, capital other auxiliary equipment. Power generated in the fuel cell is greater because of lower voltage loss in electrical leads and lateral conduction attributable to the efficient cell design.

In the combined fuel cell/smelting cell of the present invention, the process integration makes use of the copious amounts of high temperature heat evolved from the solid oxide fuel cells. The integrated fuel cell/refinery/smelting cell of the present invention integrates a refinery with a smelting plant.

Low cost refineries are located close to bauxite mines to minimize the cost of transporting bauxite ore. Low cost smelting plants are situated close to sources of cheap electricity, usually hydroelectricity. Few sites have both bauxite ore and inexpensive electrical power. So, the alumina refining and smelting plants for the production of aluminum have been separate entities with the requirement to transport alumina between them, from the ore refinery to the smelting plants.

In the combined fuel cell/smelting cell of the present invention, several international locations are known to have both bauxite ore and inexpensive natural gas or fossil fuels. The transportation costs of alumina are eliminated, e.g., at a reduction of about $0.05/lb on the price of aluminum, at $50/tonne transportation cost.

Waste heat from the SOFCs used to drive the smelter is used to heat the refinery as well.

The integrated process of the present invention uses the efficient DC electrical energy generated by the SOFC and the heat transfer which supplies the endothermic heat to the smelting cell. In the case of an inert anode cell, hot oxygen is supplied to one or more of the driving fuel cells.

The integrated process of the present invention further uses hot gases from the fuel cell to fire the fluidized bed calciner of the refining plant. The alumina produced in the calciners at 900–950° C. is normally cooled down, stock piled, and shipped to the smelter where it is stockpiled again and finally fed to the Hall-Heroult cells at close to ambient temperature. In an integrated plant of the present invention, the alumina produced in the calciners at 900–950° C. is fed as hot alumina directly to the smelting cells in a fluidized state. If desired, inert gas washes, i.e., depleted SOFC air stream, is used to remove water vapor. The hot alumina provides energy to the endothermic smelting cells.

In an integrated plant of the present invention, a continuous process requires no storage of inventory of materials between stages. The hot alumina provides energy to the endothermic smelting cells.

The calciner in the integrated process of the present invention preferably uses a portion of its waste heat to produce steam to drive the aqueous or "wet" side of the refining process, such as steam to heat the digesters and run the evaporators. Therefore the calcination heat is used twice, once for calcination and then for steam generation.

An important part of analyzing the effect of any developmental project or action item on net carbon dioxide emissions is not only to examine the emissions at the smelter but also the emissions at the power source and refinery. A smelter getting its power from hydroelectricity does not mean no CO, emissions from burning coal. In a saturated hydroelectricity market, as in the U.S., a smelter switching from buying power from a coal plant to a hydroelectric source only means that someone else will buy power from the coal fired plant. The net effect on carbon dioxide emissions is zero.

However, a smelter cutting in half the electrical energy in a pound of aluminum produces a net reduction in $CO_2$ emissions. If the power source were hydroelectric, the smelter could cut its electric demand in half. Some one else would buy that hydroelectric power, rather than buying power from a coal plant. Somewhere a coal plant would be idled, reducing the production of carbon dioxide.

For the Hall-Heroult cell with conventional refining and a coal fired power plant, the total carbon dioxide production is 16.74 lb $CO_2$/lb Al. For a combined smelting/fuel cell of the present invention integrated with a refining plant, the total carbon dioxide production is 2.32 lb $CO_2$/lb Al. At a factor of 8 difference in $CO_2$ emissions there is a factor of about two effect by using, methane as a fuel which produces more water vapor and less $CO_2$, a factor of two reduction in the energy needed to smelt aluminum because of less IR drop, and a factor of two difference in tile conversion of energy by using an efficient fuel cell versus a heat engine.

Accordingly, a several fold reduction in the $CO_2$ evolved during the production of aluminum is provided even using a fossil fuel burning power source.

The two main types of SOFCs sure tubular and planar. Tubular cells solve a sealing problem but lose power because of contact resistance. Energy density per unit volume also is low.

Planar cells have less IR drop and greater energy density, but sealing the cells at high temperature and with thermal cycling is an issue. Planar SOFCs interface more easily with planar smelting cells.

Lower operating temperatures (700–900° C.) reduce the rate of degradation and corrosion of materials as well as permit the use of metal interconnects and seals. Lower operating temperatures reduce material costs and fix the leakage problem. However, at lower temperatures, the IR drop through the electrolyte becomes prohibitive.

Some designs use an external reformer and run the SOFC from hydrogen. Others use internal reforming. Internal reforming balances the exo-thermicity of the hydrogen reaction with the endo-thermicity of the reforming reaction. Internal reforming runs the risk of carbon fouling, but this is avoided by using excess water vapor.

High pressure improves cell performance, reduces concentration polarization, improves fuel utilization, and permits a smaller interconnect space. In using the exhaust gases to heat calcination, the cell is pressurized to drive the process flow. High pressure requires a compressor and the energy to drive it.

In the smelting process of tile present invention, the inert anode is preferable to sacrificial carbon anodes because it holds geometric tolerances, thereby permitting smaller anode current densities (ACD) and better electrical efficiencies. The hot oxygen evolved on the anode can be used to supply one of the fuel cell cathodes. If no bubbles are evolved, as with a porous or oxide conducting anode, the ACD can be made thinner still.

Lower temperatures in the smelting cell reduce the wear on cell materials and permit greater use of common metals. The wear rate on an inert anode would be less at low temperatures. Sodium activity is less at lower temperatures, thereby prolonging cell life. However, the solubility and rate of dissolution of alumina is less at lower temperatures, and is ameliorated by using external alumina dissolution.

In the process of the present invention, the inert anode can be porous to allow the penetration of oxygen gas to the adjacent fuel cell cathode. The pores are treated with CVD BN Chemical Vapor Deposited Boron Nitride to prevent bath penetration. Alternately, the inert anode is constructed of an oxide conductor, e.g., such as ceria or zirconia, at certain temperatures, which conducts oxide ion's directly to the SOFC electrolyte. At smelting cell current efficiencies less than 100%, additional air is fed to the adjacent SOFC cathode. In the case that HF is observed to degrade the inert anode as well as the fuel cell, a completely sealed SOFC is used.

A high 'surface area cell increases the energy efficiency of a smelting cell. By increasing the surface area per unit volume, the current density is reduced while increasing or maintaining aluminum production. At power loss, $I^2R$, current density reductions have a marked effect on energy losses. Power loss has tile limitation of endothermic heat loss problems. The combined fuel cells/smelting cells of the present invention counter this effect and make high surface area cells practical.

External alumina dissolution, involving alumina dissolved in Hall-Heroult cell bath in a separate vessel provides saturation and precludes large suspended particles from entering the smelting cell. Inert anodes require alumina saturated bath to reduce wear rate, but solubility control can be hard to maintain in simple cells where the alumina is added directly. External alumina dissolution with active recirculation of electrolyte attain's this control. Thin ACDs can not be mainitainied with suspended alumina particles in the electrolyte which could lead to clogging or mucking of the metal pad. Miniaturization could not be achieved without external alumina dissolution.

Process steam from calcination provides added energy efficiency realized by converting the waste heat of the calcination process to steam. Conventional processes have not surmounted the economic barrier of the cost of rebuilding the hot end of the calciner. In one aspect, the process of the present invention redesigns the calciner hot-end to handle heating with SOFC off-gases and hot alumina feed. Process steam from calcination is added as an extra bonus.

The energy efficiency of the SOFC driven smelting process of the present invention provides significant efficiencies by and through utilizing the fuel cell waste heat to heat the smelting cell, to heat the incoming, gas streams, to drive methane reforming, and to supply heat to the alumina refining process.

Fuel cell and smelting cell efficiencies of the present invention are improved by reducing electrical lead resistance, by decreasing the thickness of electrolyte and electrodes, by reducing the current density, and by simultaneously increasing the electrode area per unit volume.

In the process of the present invention, net $CO_2$ reduction is 86% of that of aluminum production by the conventional Hall-Heroult Cell. Most of the net $CO_2$ reduction is in the form of idled fossil fuel plants as a result of increased efficiency. Some of that is attributable to burning methane, which produces more water vapor, as opposed to coal. Minor amounts are attributable to supplying heat to the refinery and eliminating $CO_2$ from Hall-Heroult cells with inert anodes.

Thus, it can be seen that the present invention accomplishes all of the stated objectives.

Although the invention has been illustrated by the preceding detailed description, it is not intended to be construed as being limited to tile specific preferred embodiments employed therein.

Whereas particular embodiments of the invention have been described herein above, for purposes of illustration, it will be evident to those skilled in the art that numerous variations of the details may be made without departing from the invention as defined in the appended claims.

What is claimed is:

1. A process for smelting alumina to produce aluminum metal, comprising:
   (a) providing a solid oxide fuel cell;
   (b) providing an electrolytic smelting cell for the production of aluminum from refined alumina positioned within two centimeters of said solid oxide fuel cell;
   (c) providing conductive heat transfer back and forth from said electrolysis cell and said fuel cell;
   (d) providing electrical transfer back and forth from said electrolysis cell and said fuel cell; and (e) wherein aluminum is produced in said electrolysis cell with conductive heat exchange and reduced electrical resistance from said fuel cell.

2. A process for smelting alumina to produce aluminum metal as set forth in claim 1, wherein said smelting cell comprises an inert anode smelting cell, and further comprising passing oxide ions from said inert anode smelting cell through a solid cathode in said fuel cell and through a solid electrolyte in said fuel cell to a solid anode in said fuel cell.

3. A process for smelting alumina to produce aluminum metal as set forth in claim 1, further comprising:

(f) providing an alumina ore refinery for producing said refined alumina by the Bayer process, wherein said refinery is positioned near said solid oxide fuel cell to pass said refined alumina at an elevated temperature directly from said alumina refinery to said electrolytic smelting cell; and (g) providing waste heat from said fuel cell to supply heat to said alumina ore refinery, thereby reducing the cost of the refined alumina.

4. A process for smelting alumina to produce aluminum metal as set forth in claim 3, wherein said providing an electrolytic smelting cell for the production of aluminum from refined alumina positioned near said solid oxide fuel cell comprises providing al electrolytic smelting cell positioned within no more than two centimeters distance from said solid oxide fuel cell, and further comprising (d) passing said refined alumina at a temperature of at least 900° C. directly from said alumina ore refinery to said electrolytic smelting cell.

5. A process for smelting alumina to produce aluminum metal as set forth in claim 1, wherein said solid oxide fuel cell comprises a planar solid oxide fuel cell.

6. A process for smelting alumina to produce aluminum metal as set forth in claim 5, wherein said planar solid oxide fuel cell incorporates a nickel/yttria stabilized zirconia cermet anode.

7. A process for smelting alumina to produce aluminum metal as set forth in claim 5, wherein said planar solid oxide fuel cell incorporates a solid state cathode.

8. A process for smelting alumina to produce aluminum metal as set forth in claim 7, wherein said solid state cathode comprises lanthanum strontium manganate.

9. A process for smelting alumina to produce aluminum metal as set forth in claim 5, wherein said planar solid oxide fuel cell incorporates a solid electrolyte.

10. A process for smelting alumina to produce aluminum metal as set forth in claim 9, wherein said solid electrolyte comprises yttria stabilized zirconia.

11. Apparatus for smelting alumina to produce aluminum metal, comprising:

(a) a solid oxide fuel cell; and (b) an electrolytic smelting cell for the production of aluminum from refined alumina positioned within two centimeters of said solid oxide fuel cell; and c) means for providing electrical transfer back and forth from said electrolytic cell said fuel cell.

12. Apparatus for smelting alumina to produce aluminum metal as set forth in claim 11, further comprising (c) an alumina ore refinery for producing said refined alumina, wherein said refinery is positioned to pass said refined alumina at an elevated temperature directly from said alumina refinery to said electrolytic smelting cell and to provide waste heat from said fuel cell to supply heat to said alumina ore refinery, thereby reducing the cost of the refined alumina.

13. Apparatus for smelting alumina to produce aluminum metal as set forth in claim 12, wherein said electrolytic smelting cell is positioned within no more than two centimeters distance from said solid oxide fuel cell, and further comprising (d) means for passing said refilled alumina at a temperature of at least 900° C. directly from said alumina ore refinery to said electrolytic smelting cell.

14. Apparatus for smelting alumina to produce aluminum metal as set forth in claim 13, wherein said solid oxide fuel cell comprises a planar solid oxide fuel cell.

15. Apparatus for smelting alumina to produce aluminum metal its set forth in claim 14, wherein said planar solid oxide fuel cell incorporates a nickel/yttria stabilized zirconia cermet anode.

16. Apparatus for smelting alumina to produce aluminum metal as set forth in claim 14, wherein said planar solid oxide fuel cell incorporates a solid state cathode.

17. Apparatus for smelting alumina to produce aluminum metal as set forth in claim 16, wherein said solid state cathode comprises lanthanum strontium manganate.

18. Apparatus for smelting alumina to produce aluminum metal as set forth in claim 14, wherein said planar solid oxide fuel cell incorporates a solid electrolyte.

19. Apparatus for smelting alumina to produce aluminum metal as set forth in claim 18, wherein said solid electrolyte comprises yttria stabilized zirconia.

20. A process for smelting alumina to produce aluminum metal, comprising:

(a) providing a planar solid oxide fuel cell having a solid state cathode of lanthanum strontium manganate, a solid electrolyte of yttria stabilized zirconia, and a nickel/yttria stabilized zirconia cermet anode;

(b) providing an inert anode electrolytic smelting cell for the production of aluminum from refined alumina positioned within two centimeters of said solid oxide fuel cell;

(c) providing an alumina ore refinery for producing said refined alumina, wherein said refinery is positioned near enough to said solid oxide fuel cell to pass said refined alumina at an elevated temperature directly from said alumina refinery to said electrolytic smelting cell;

(d) passing said refined alumina at a temperature of at least 900 degrees C directly from said alumina ore refinery to said electrolytic smelting cell; and (e) passing oxide ions from said inert anode electrolytic smelting cell through said solid state cathode and solid electrolyte to said cermet anode.

21. Apparatus for reducing a metal salt to a metal, comprising:

(a) an electrolysis cell comprising an electrolysis anode, an electrolysis cathode, and a metal salt in a chamber between the electrolysis anode and cathode, (b) a fuel cell comprising a fuel cell cathode adjacent said electrolysis anode and connected electrically therewith, a fuel cell anode, a solid conductor of anions between said fuel cell cathode and anode, and a fuel compartment adjacent said fuel cell anode, and (c) conductor means for electrically connecting said electrolysis cathode and said fuel cell anode.

22. A process for electrolytically reducing a metal salt to a metal in the apparatus, comprising:

a) an electrolysis cell comprising an electrolysis anode, an electrolysis cathode, and a metal salt in a chamber between the electrolysis anode and cathode, b) a fuel cell comprising a fuel cell cathode adjacent said electrolysis anode and connected electrically therewith, a fuel cell anode, a solid conductor of anions bwtween said fuel cell cathode and anode, and a fuel compartment adjacent said fuel cell anode, and c) conductor means for electrically connecting said electrolysis cathode and said fuel cell anode;

c) conductor means for electrically connecting said electrolysis cathode and said fuel cell anode;

said process comprising:

(1) reacting a fuel with anions adjacent said fuel cell anode, (2) electrolyzing said metal salt in said electrolysis cell, thereby to produce a metal adjacent said electrolysis cathode and anions adjacent said electrolysis anode, and (3) utilizing the anions of step (2) in the reaction of step (1).

23. The process for electrolytically reducing a metal salt to a metal of claim 22, further comprising (4) providing conductive heat transfer back and forth between said electrolysis cell and said fuel cell.

24. The process for electrolytically reducing a metal salt to a metal of claim 23, wherein said metal is a metal selected from the group consisting of aluminum, magnesium, silicon, titanium, lithium, lead, zinc, and zirconium.

25. The process for electrolytically reducing a metal salt to a metal of claim 24, wherein said metal salt is a metal salt selected from the group consisting of aluminum oxide, magnesium oxide, silicon oxide, titanium oxide, lithium oxide, lead oxide, zinc oxide, zirconium oxide, and aluminum chloride.

* * * * *